(12) United States Patent
Chen et al.

(10) Patent No.: US 10,922,684 B2
(45) Date of Patent: *Feb. 16, 2021

(54) MOBILE DEVICE SECURITY USING WEARABLE SECURITY TOKENS

(71) Applicant: MICROSOFT TECHNOLOGY LICENSING, LLC, Redmond, WA (US)

(72) Inventors: Yuqun Chen, Seattle, WA (US); Gideon A. Yuval, Mercer Island, WA (US); Michael Jack Sinclair, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 566 days.

This patent is subject to a terminal disclaimer.

(21) Appl. No.: 15/721,032

(22) Filed: Sep. 29, 2017

(65) Prior Publication Data

US 2018/0025351 A1  Jan. 25, 2018

Related U.S. Application Data

(63) Continuation of application No. 14/659,413, filed on Mar. 16, 2015, now Pat. No. 9,805,365, which is a
(Continued)

(51) Int. Cl.
*G06Q 20/36* (2012.01)
*G06Q 20/20* (2012.01)
*G06Q 20/32* (2012.01)

(52) U.S. Cl.
CPC ....... *G06Q 20/3674* (2013.01); *G06Q 20/204* (2013.01); *G06Q 20/321* (2020.05); *G06Q 20/322* (2013.01)

(58) Field of Classification Search
CPC ..... G06Q 20/322–3229; G06Q 20/327; G06Q 20/3278; G06Q 20/367; G06Q 20/3674
See application file for complete search history.

(56) References Cited

U.S. PATENT DOCUMENTS

| 7,240,836 B2 | 7/2007 | Vrotsos et al. |
| 7,269,732 B2 | 9/2007 | Kilian-Kehr |

(Continued)

FOREIGN PATENT DOCUMENTS

| EP | 1801721 A1 | 6/2007 |
| KR | 1020060025503 A | 3/2006 |

(Continued)

OTHER PUBLICATIONS

"Intel Demonstrates New Bluetooth Hardware and Software Technology for the First Time", Retrieved from <<https://web.archive.org/web/20041114101410/http://findarticles.com/p/articles/mi_m0WUB/is_1999_Dec_13/ai_58248443/>>, Dec. 13, 1999, 2 Pages.

(Continued)

*Primary Examiner* — Jay Huang
(74) *Attorney, Agent, or Firm* — Workman Nydegger

(57) ABSTRACT

Optimizations are provided for completing a transaction event using authentication information. In particular, a presence of a transaction processing device is initially detected. Then, transaction information is received from the transaction processing device. The transaction information corresponds to a current transaction event. After receiving the information, a communication link is established with an on-body device. This device includes authentication information that is necessary to complete the current transaction event. The authentication information is then received from the on-body device. This information has a time-limited use availability. Finally, the received authentication information is used to complete the current transaction event.

16 Claims, 11 Drawing Sheets

Related U.S. Application Data continuation of application No. 12/025,156, filed on Feb. 8, 2008, now Pat. No. 9,135,620.

(56) References Cited

U.S. PATENT DOCUMENTS

| | | | |
|---|---|---|---|
| 7,652,573 B2 | 1/2010 | Donat et al. | |
| 8,332,272 B2 | 12/2012 | Fisher | |
| 9,135,620 B2* | 9/2015 | Chen | G06Q 20/204 |
| 2002/0112171 A1* | 8/2002 | Ginter | G06Q 20/085 |
| | | | 713/185 |
| 2003/0160732 A1* | 8/2003 | Van Heerden | G06K 19/07758 |
| | | | 343/897 |
| 2004/0250074 A1 | 12/2004 | Kilian-Kehr | |
| 2005/0105734 A1 | 5/2005 | Buer et al. | |
| 2005/0191990 A1* | 9/2005 | Willey | H04L 9/3268 |
| | | | 455/411 |
| 2006/0249572 A1 | 11/2006 | Chen et al. | |
| 2007/0262134 A1* | 11/2007 | Humphrey | G07F 19/20 |
| | | | 235/379 |
| 2008/0016004 A1* | 1/2008 | Kurasaki | G06Q 20/3823 |
| | | | 705/67 |
| 2008/0088413 A1 | 4/2008 | Richter | |
| 2008/0147488 A1 | 6/2008 | Tunick et al. | |
| 2008/0204117 A1* | 8/2008 | Richter | H04B 13/005 |
| | | | 327/517 |
| 2008/0244714 A1 | 10/2008 | Kulakowski et al. | |
| 2009/0023474 A1 | 1/2009 | Luo et al. | |
| 2009/0098825 A1* | 4/2009 | Huomo | H04M 1/7253 |
| | | | 455/41.1 |
| 2014/0282878 A1* | 9/2014 | Ignatchenko | H04L 63/08 |
| | | | 726/3 |
| 2015/0186876 A1 | 7/2015 | Chen et al. | |

FOREIGN PATENT DOCUMENTS

| | | |
|---|---|---|
| KR | 100625503 B1 | 9/2006 |
| WO | 02084460 A2 | 10/2002 |
| WO | 2007019735 A1 | 2/2007 |

OTHER PUBLICATIONS

"Proximity Mobile Payments: Leveraging NFC and the Contactless Financial Payments Infrastructure", In a Smart Card Alliance Contactless Payments Council White Paper, Sep. 2007, 39 Pages.

Schneier, Bruce, "Applied Cryptography", Published by John Wiley & Sons, Inc., Jan. 1, 1996, 45 Pages.

"Office Action Issued in European Patent Application No. 08872174.1", dated Feb. 8, 2017, 6 Pages.

"Supplementary Search Report Issued in European Patent Application No. 08872174.1", dated Jul. 16, 2014, 6 Pages.

"Final Office Action Issued in U.S. Appl. No. 12/028,156", dated Dec. 5, 2013, 21 Pages.

"Final Office Action Issued in U.S. Appl. No. 12/028,156", dated Dec. 30, 2010, 31 Pages.

"Non Final Office Action Issued in U.S. Appl. No. 12/028,156", dated Aug. 15, 2013, 21 Pages.

"Non Final Office Action Issued in U.S. Appl. No. 12/028,156", dated Aug. 8, 2014, 6 Pages.

"Non Final Office Action Issued in U.S. Appl. No. 12/028,156", dated Jun. 7, 2010, 22 Pages.

"Notice of Allowance Issued in U.S. Appl. No. 12/028,156", dated Jun. 24, 2014, 11 Pages.

"Notice of Allowance Issued in U.S. Appl. No. 12/028,156", dated Apr. 9, 2014, 14 Pages.

"Notice of Allowance Issued in U.S. Appl. No. 12/028,156", dated Apr. 3, 2015, 10 Pages.

"Notice of Allowance Issued in U.S. Appl. No. 12/028,156", dated Feb. 5, 2015, 15 pages.

"Notice of Allowance Issued in U.S. Appl. No. 12/028,156", dated Feb. 26, 2015, 10 Pages.

"Non Final Office Action Issued in U.S. Appl. No. 14/659,413", dated Dec. 16, 2015, 10 Pages.

"Notice of Allowance Issued in U.S. Appl. No. 14/659,413", dated Jun. 6, 2016, 9 Pages.

"Notice of Allowance Issued in U.S. Appl. No. 14/659,413", dated Jul. 19, 2017, 9 Pages.

Karnouskos, et al., "Mobile Payment: A Journey through Existing Procedures and Standardization Initiatives", In IEEE Communications Surveys & Tutorials, vol. 6, Issue 4, Oct. 1, 2004, pp. 44-66.

Nicholson, et al., "Mobile Device Security Using Transient Authentication", In IEEE Transactions on Mobile Computing, vol. 5, No. 11, Nov. 2006, 14 Pages.

"International Search Report and Written Opinion Issued in PCT Application No. PCT/US2008/088567", dated May 29, 2009, 11 Pages.

Rankl, et al., "Smart Card Handbook", Published by Wiley Publications, Oct. 2, 2000, 397 Pages.

* cited by examiner

MOBILE DEVICE SECURITY USING WEARABLE SECURITY TOKENS

CROSS-REFERENCE TO RELATED APPLICATIONS

This application is a continuation of U.S. patent application Ser. No. 14/659,413 filed on Mar. 16, 2015, entitled "MOBILE DEVICE SECURITY USING WEARABLE SECURITY TOKENS," which issued as U.S. Pat. No. 9,805,365 on Oct. 31, 2017, which is a continuation of U.S. patent application Ser. No. 12/028,156 filed on Feb. 8, 2008, entitled "MOBILE DEVICE SECURITY USING WEARABLE SECURITY TOKENS," which issued as U.S. Pat. No. 9,135,620 on Sep. 15, 2015, the entirety of each of which are incorporated herein by reference.

BACKGROUND

Computer technology can influence various aspects of data storage, such as encryption of data persisted on storage devices. A variety of protection schemes can be implemented to increase the security of, and limit access to, content on such storage devices. For instance, data can be encrypted in a manner that requires a key to unlock data. Without such a key, it can be virtually impossible to access data, and breaking encryption can take countless hours.

Mobile devices are becoming a pervasive and all encompassing device for communication, entertainment, commerce, and personal finance. Moreover, there currently is a world-wide push by the banking institutions and telecommunication companies to position a panoply of mobile devices (e.g., cell phones, smart phones, laptop computers, and the like) as the ultimate consumer payment device. Accordingly, as portable devices become the repository and custodian of sensitive personal information, securing such devices against theft and hacking (e.g., engaging in illegal machine trespass, such as contravening computer security) has become of paramount importance.

BRIEF SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

The claimed subject matter in accordance with an aspect provides systems and methods that effectuate, establish, and facilitate mobile device security whereby a mobile device detects points of sales mechanisms or wearable secure token devices and based at least in part on the detection of the wearable secure token devices, the mobile device releases funds stored or associated with the mobile device for payment of debts accrued by the owner of the mobile device at the point of sale mechanisms.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents.

Other advantages and novel features will become apparent from the following detailed description when considered in conjunction with the drawings.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
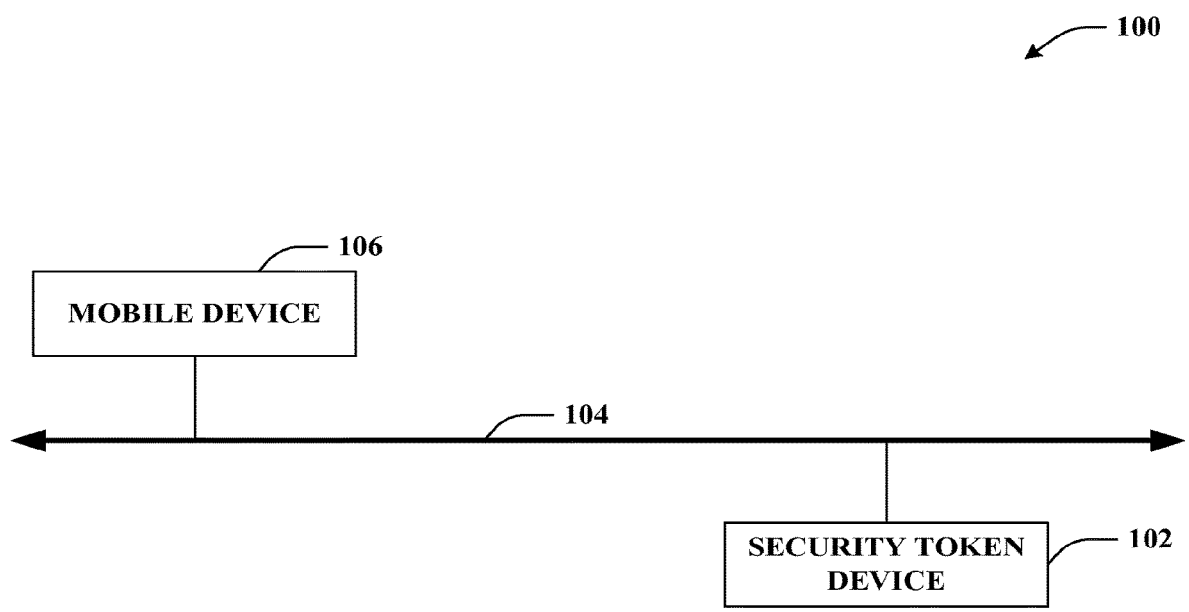
FIG. 1 illustrates a machine-implemented system that facilitates, establishes, and effectuates mobile device security in accordance with an aspect of the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

When it comes to using mobile devices (e.g., smart phones, cell phones, laptop computers, notebook computers, Tablet PCs, Personal Digital Assistants (PDAs), and the like) as repositories and/or stewards of sensitive personal information (e.g., bank account details, Social Security numbers, credit card numbers, debit card numbers, etc.) the number one concern for most users is theft. For example, because cell phones are utilized much more often than ones wallet, ones cell phone is typically easier to lose than ones wallet. Many software or hardware mechanisms have been proposed or implemented to make it difficult or impossible for those capable of improbity to obtain sensitive information from stolen mobile devices. So far, few, if any of these schemes seem promising against hard-core hackers.

In addition, a drawback of existing protection schemes is the requirement that the user authenticate themselves to their mobile or portable devices, for example, by typing a login name and password or Personal Identification Number (PIN) code couplet. Typing such login name and password or Personal Identification Number (PIN) code couplets or variations thereof are typically inconvenient and cumbersome. Consequently, most users either utilize authentication couplets that are trivial to disambiguate or opt to disable security measures completely. While there have been proposals to employ biometrics such as fingerprints, retinal or iris scans, and the like, to replace the onus imposed on the user to enter passwords, these modalities have not been satisfactorily proven and are in many instances still in their development stages. Furthermore, since fingerprints are easy to capture and replay, they generally do not provide a reliable authentication mechanism.

The claimed subject matter in accordance with an illustrative aspect severs or separates the security management functionality from the mobile device wherein the user can typically wear a security token device (e.g., a finger ring, necklace, earring, labret, clothing, fabric, textile, . . . ) that contains cryptographic keys for unlocking sensitive data on the mobile device. Separating the security management functionality from the device and devising appropriate security protocols ensures that a potential thief needs to steal both the mobile device and the wearable security token device—a much more onerous and less rewarding task—in order to obtain, or gain access to, sensitive data persisted on the mobile device. Similarly, users need to lose both their mobile device and their wearable security token device to render the sensitive information stored on the mobile device vulnerable to scrutiny by the unscrupulous.

The claimed subject matter in accordance with another illustrative aspect, in order to separate the security management operability from the mobile device employs a root key included with the wearable security token from which all keys employed by the mobile device can be derived. Moreover, in further aspects, the claimed subject matter can have multiple keys and/or a plurality of secrets persisted on, or included with, the wearable security token.

In yet a further aspect of the claimed subject matter, the encryption schemes employed can be based at least in part on asymmetric public keys systems (PKS) or symmetric key systems (e.g., block ciphers or stream ciphers), with the former typically having stronger protection against misappropriation, hacks, cyber piracy, and the like. Examples of cryptographic asymmetric public key systems that can be employed by the claimed subject matter include techniques such as Diffie-Hellman, Digital Signature Standard (DSS), various elliptic curve modalities, RSA, Cramer-Shoup, Merkle-Hellman 'knapsack' algorithms, Paillier cryptosystems, etc. Examples of symmetric key systems that can be employed with equal utility by the claimed subject matter can include techniques such as Twofish, the Advanced Encryption Standard (AES), Blowfish, Serpent, RC4, Triple Data Encryption Standard (TDES), International Data Encryption Algorithm (IDEA), and the like. Moreover it should be noted, solely for the purposes of exposition rather than limitation, that the key lengths that can be utilized for purposes of encryption can be greater than or less than the $2^7$- or $2^8$-bits currently and typically practicable in this field of endeavor.

Typically, the security token can contain a root key (e.g., $K_{root}$) such that all secret contents (e.g., Social Security number, Personal Identification Numbers (PINs), financial institution information, bank account numbers, and the like) persisted on a mobile device can be encrypted and/or decrypted with the root key. Additionally, the security token can also have persisted thereon the public key of the mobile device's key pair (e.g., $K_{mobile\ device}^{public}$) whereby the security token can employ the stored public key to verify requests from the mobile device.

Accordingly, when the mobile device needs to decrypt or encrypt an item, the mobile device can request a root key from the security token. A challenge response protocol can then be employed between the security token and the mobile device in order to prevent or deter replay attacks. For instance, the mobile device can send a request to the security token requesting the root key (e.g., $K_{root}$). The security token on receiving the request from the mobile device can respond with a randomly generated number. On receipt of the randomly generated number from the security token, the mobile device can respond with the encrypted version of the received randomly generated number wherein encryption is undertaken using the mobile device's private key (e.g., $K_{mobile\ device}^{private}$). The security token can then verify the encrypted version of the randomly generated number by using the mobile device's public key (e.g., $K_{mobile\ device}^{public}$) that has previously been associated with, or persisted on, the security token. Once verification passes, the security token can transmit the root key (e.g., $K_{root}$) encrypted with the mobile device's public key back to the requesting mobile device. It should be noted that while the subject matter as claimed above is explicated, in part, in terms of a challenge-response protocol, other secure communication protocols can also be employed with equal utility and success and can fall within the ambit of the claimed subject matter. It should also be noted that the mobile device should generally keep the disseminated root key only for the duration of its use. Afterwards, the mobile device should typically securely eliminate the key from its memory.

FIG. 1 illustrates a machine implemented system 100 that effectuates and facilitates mobile device security in accordance with an aspect of the claimed subject matter. System 100 can include security token device 102 that can contain one or more cryptographic keys for unlocking or locking sensitive data on a mobile device 106, the one or more cryptographic keys typically being distributed to mobile device 106 via communication or network topology 104. Security token device 102 can be included with, or incorporated in, textiles, fabric, clothing, jewelry, or any item that can be worn, and typically is a tangible object. Additionally, security token device 102 can be a Radio Frequency Identification (RFID) device, or can incorporate or subsume a Radio Frequency Identification (RFID) device. For example, security token device 102 can be a wrist band that has embedded therein a Radio Frequency Identification (RFID) tag or chip. Additionally, security token device 102 can have mechanical, acoustical or optical communication means. All of these means—direct electrical contact, RFID, NFC, acoustical and optical—a can also supply a source of harvestable energy for electrically powering security token device 102. Security token device 102 exhibiting direct contact for communication has the least chance of being compromised by an interloper during mobile and token device communication. Also, direct electrical contact generally does not require an antenna or other collecting device other than electrical contact and hence, can be made smaller and lower-cost. Metal jewelry can benefit from this mode of communication without having to expose a detector or antenna. Security token device 102 can typically have persisted thereon at least a root key associated with mobile device 106 from which all other keys utilized by mobile device 106 can be derived. In some aspects of the claimed subject matter multiple root keys and/or more secrets affiliated with mobile device 106 can be stored in or on security token device 102.

As illustrated security token device 102 can be in continuous and operative, or sporadic and/or intermittent, communication with mobile device 106 via network topology 104. Moreover, security token device 102 can be implemented entirely in hardware and/or a combination of hardware and/or software in execution. Further, security token device 102 can be incorporated within and/or associated with other compatible components.

Network topology 104 can include any viable communication and/or broadcast technology, for example, wired and/or wireless modalities and/or technologies can be utilized to effectuate the claimed subject matter. Moreover, network topology 104 can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and distributed—and/or any combination, permutation, and/or aggregation thereof. Additionally, network topology 104 can include or encompass communications or interchange utilizing Near-Field Communications (NFC) and/or communication utilizing electrical conductance through the human skin surface, for example.

Mobile device 106 can be implemented entirely in hardware and/or as a combination of hardware and/or software in execution. Further, mobile device 106 can be any type of machine that includes a processor and is capable of effective communication with network topology 104. Illustrative machines that can comprise mobile device 106 can include desktop computers, server class computing devices, cell phones, smart phones, laptop computers, notebook computers, Tablet PCs, consumer and/or industrial devices and/or appliances, hand-held devices, personal digital assistants, multimedia Internet mobile phones, multimedia players, and the like.

Figure 2:
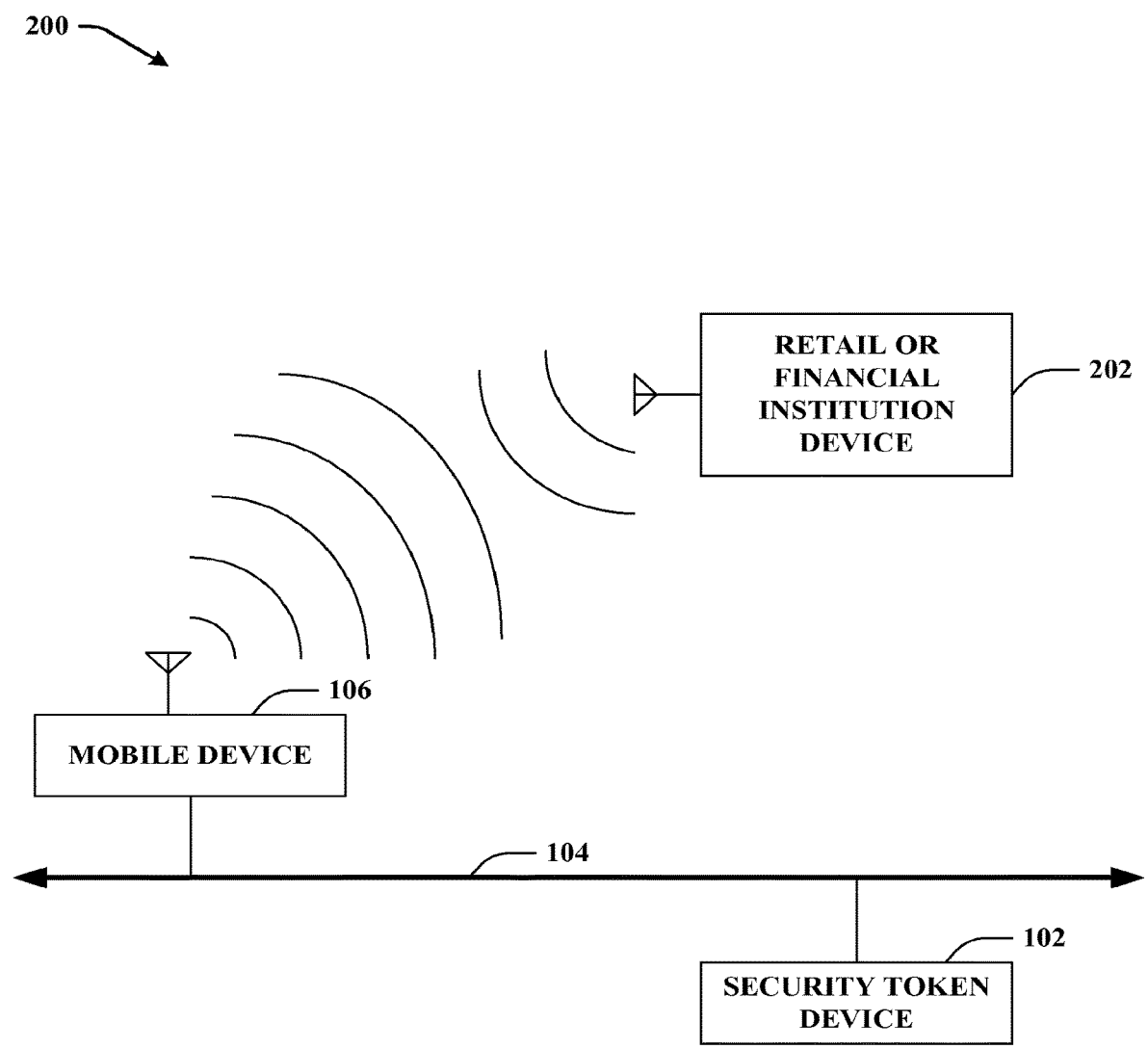
FIG. 2 depicts a machine-implemented system that facilitates, establishes, and effectuates mobile device security in accordance with a further aspect of the claimed subject matter.

FIG. 2 provides illustration of a system 200 implemented on a machine that effectuates and facilitates mobile device security in accordance with an aspect of the claimed subject matter. System 200 can include security token device 102, network or communications topology 104, and mobile device 106. Nevertheless, because much of the configuration and operation of the security token device 102, network or communications topology 102, and mobile device 106 are substantially similar or the same as that described with respect to FIG. 1, a detailed description of such features has been omitted for the sake of brevity. Accordingly, system 200 can additionally include retail or financial institution device 202 (e.g., a Point of Sale (POS), Automated Teller Machine (ATM), and the like).

As illustrated mobile device 106 can be in constant, or intermittent but operative, communication with retail or financial institution device 202. Typically however, mobile device 106 will be in sporadic communication with retail or financial institution device 202, via appropriately positioned antennae, when owner/user of mobile device 106 wishes to obtain funds from his/her financial institution to pay for goods and/or services rendered by retail establishments or service providers. Generally, the interaction between mobile device 106 and retail or financial institution device 202 can take one of two forms, for example. In one aspect, the owner/user of mobile device 106 may wish to obtain "electronic" funds from his/her financial institution and persist these "electronic" funds on mobile device 106 for future payment of goods and/or services purchased at a subsequent time. Thus, in accordance with this illustrative aspect, system 200 can operate, without limitation, in the following manner. Mobile device 106 can be placed in communication with security token device 102. For example, mobile device 106 can be brought into close proximity (e.g., within millimeters) with security token device 102. Alternatively and/or additionally, mobile device 106 and security token device 102 can be brought into momentary physical contact one another.

Regardless, of whether mobile device 106 and security token device 102 are brought into contact or in proximity with one another, communication and data interchange between mobile device 106 and security token device 102 can be effectuated between the two devices wherein mobile device 106 can request a root key (e.g., $K_{root}$) from security token device 102. When security token device 102 perceives that mobile device 106 is requesting a previously persisted and/or maintained root key, security token device 102 can generate a random number (e.g., via use of a random or pseudo-random number generator) which it then communicates (e.g., via network topology 104) to mobile device 106. Mobile device 106 on receipt of the randomly generated number can respond with an encrypted version of the randomly generated number using its private key (e.g., $K_{mobile\ device}^{private}$) from a previously agreed public-private key pair (e.g., each of security token device 102 and mobile device 106 can have one or more previously ascertained private-public key pairs that can be denoted: $K_{security\ token}^{public}$ and $K_{security\ token}^{private}$, and $K_{mobile\ device}^{public}$ and $K_{mobile\ device}^{private}$ respectively). Once security token device 102 receives the encrypted randomly generated number, security token device 102 can verify the response by using mobile device's 106 public key (e.g., $K_{security\ token}^{public}$) to decrypt the response and substantiate or corroborate that the randomly generated number is actually the one that was initially sent by security token device 102. Once security token device 102 is satisfied with the authenticity and legitimacy of communications being exchanged between itself and mobile device 106, security token device 102 can communicate the root key (e.g. $K_{root}$) that mobile device 106 initially requested. On receipt of the root key, mobile device 106 can utilize the received root key to unlock pertinent information required to have a financial institution to release "electronic" funds for storage on, and subsequent payment by, mobile device 106. In a similar fashion when security token device 102 releases the root key to mobile device 106, mobile device 106 can employ the received key to decrypt relevant information persisted on mobile device 106 required to have a financial institution satisfy the debt (e.g., transfer funds from the mobile device 106 user/owner's financial account to the purveyor of services or retailer's financial account) accrued while maintaining secure communications (e.g., interchange utilizing any one or more symmetric or asymmetric key encryption schemes) between itself, the financial institution, and a retail establishment.

Figure 3:
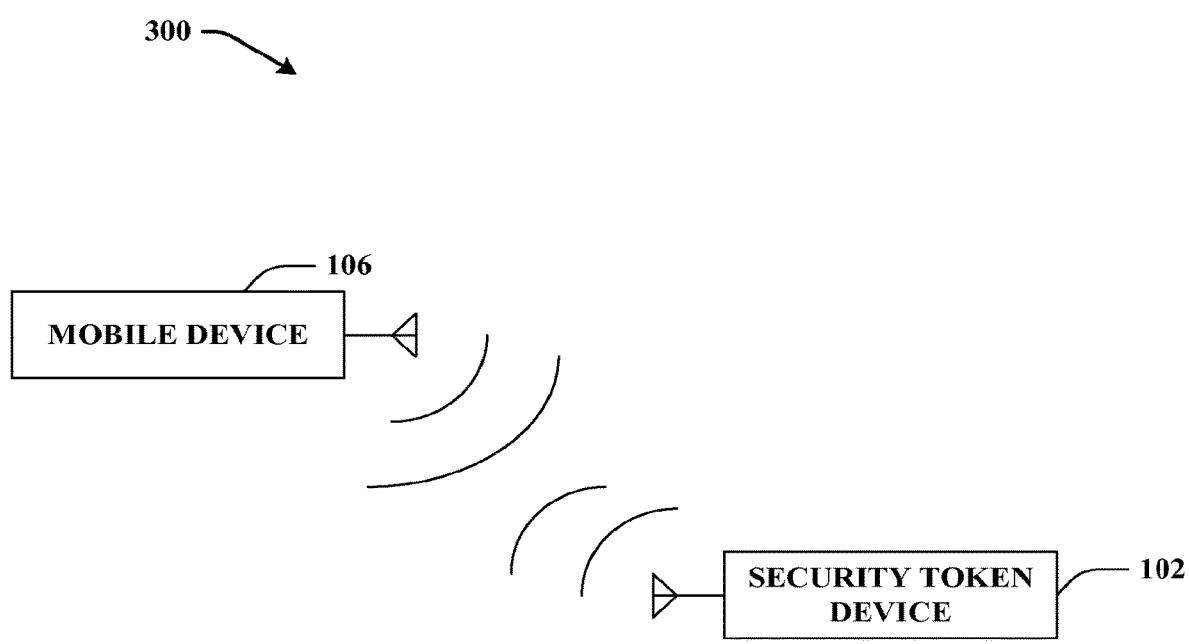
FIG. 3 illustrates a system implemented on a machine that establishes, facilitates, and effectuates mobile device security in accordance with an aspect of the claimed subject matter.

FIG. 3 provides illustration of a machine implemented system 300 that effectuates and facilitates mobile device security in accordance with a further aspect of the claimed subject matter. In accordance with this illustrative aspect, security device 102 can operate as a presence beacon to the mobile device 106 via one or more appropriately positioned antenna. As exemplified in this illustrative aspect, system 300 can operate, without limitation, in the following manner. Mobile device 106 can contact security token device 102 either periodically or on demand to determine the presence of, and its proximity to, security token device 102. Typically, proximity of mobile device 106 is generally ensured by the fact that the communication mechanism that can be employed by system 300 is based at least in part on Near-Field Communications (NFC) and/or the electrical conductance of the human body (e.g., electric conductance through the human skin surface, and the like). Still other modes of communication can be direct electrical contact, mechanical or acoustical contact or optical. Upon detection by mobile security device 106 of security token device 102 a simple challenge-response protocol can be utilized. For example, security token device 102 can have its own public-private key pair, $K_{security\ token}^{public}$ and $K_{security\ token}^{private}$ such that a copy of the public key $K_{security\ token}^{public}$ can be kept on the mobile device 106, and the private key $K_{security\ token}^{private}$ on the security token device 102. Thus, when mobile device 106 realizes that it is in the presence of security token device 102, it can, for instance, query the security token device 106 by encrypting a randomly generated number N using the security token device's 102 public key $K_{security\ token}^{public}$ whereupon security token device 102 can respond by sending back the number N encrypted with the mobile device's 106 public key $K_{mobile\ device}^{public}$ which can have been previously associated and/or stored on security token device 102. This presence beacon aspect of the claimed subject matter can be useful for mobile payment purposes wherein mobile device 106 can be employed to pay on the user's behalf when security token device 102 is detected, for example.

Figure 4:
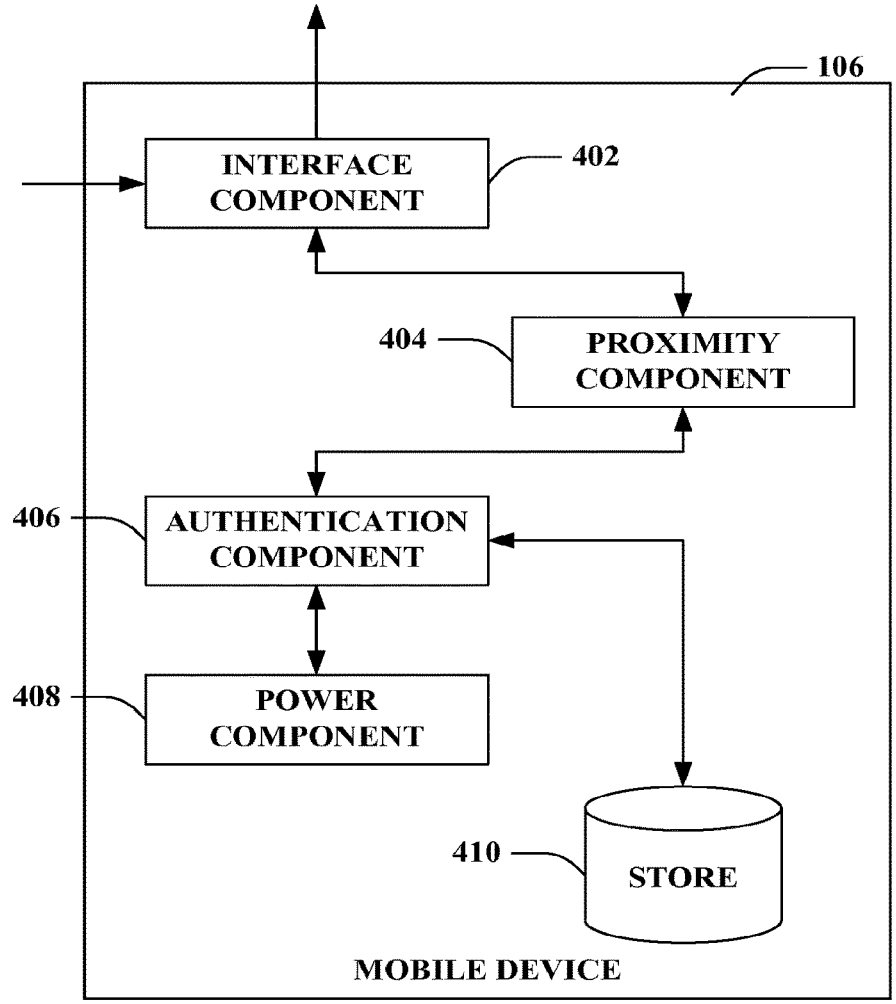
FIG. 4 provides a more detailed depiction of a mobile device that can be utilized in accordance with an aspect of the claimed subject mater.

FIG. 4 provides a more detailed depiction 400 of mobile device 106 in accordance with an aspect of the claimed subject matter. As illustrated, mobile device 106 can include interface component 402 (hereinafter referred to as "interface 402") that can receive and disseminate, communicate, and partake in data interchange with a plurality of disparate sources (e.g. security token device 102, communications from cellular phone towers, and the like) and in particular can be in continuous and/or intermittent communication with security token device 102 (not shown) via network topology 104.

As stated above, interface 402 can receive and transmit data from, and to, a multitude of sources, such as, for example, data associated with user names and passwords, sets of encryption and/or decryption keys, client applications, services, users, clients, devices, and/or entities involved with a particular transaction, portions of transactions, and thereafter convey the received information to proximity component 404, authentication component 406, power component 408, and associated store 410 for subsequent utilization, processing, and/or analysis. To facilitate its ends, interface 402 can provide various adapters, connectors, channels, communication pathways, etc. to integrate the various components included in system 400 into virtually any operating system and/or database system and/or with one another. Additionally and/or alternatively, interface 402 can provide various adapters, connectors, channels, communication modalities, and the like, that can provide for interaction with various components that can comprise system 400, and/or any other component (external and/or internal), data, and the like, associated with system 400.

Proximity component 404 can periodically, or continuously, "poll" network topology 104 to ascertain whether or not a security token device 102 (not shown) is present. Alternatively and/or additionally, proximity component 404 can be activated when mobile device 106 is brought into physical contact with security token device 102, and/or when mobile device 106 is in near-field communications (NFC) range of security token device 102 (e.g., within millimeters). Proximity component 404 thus can detect whether or not a tied (e.g., a previously associated) security token device 102 is in vicinity in order to supply a root key (e.g., $K_{root}$) required to encrypt, decrypt, lock, and/or unlock content persisted on mobile device 106. Typically, content subject to encryption, decryption, locking, and/or unlocking can, without limitation, relate to sensitive personal information, such as, Social Security Numbers, bank account details, credit and/o debit card numbers, Personal Identification Numbers (PIN), and the like.

Authentication component 406, based at least in part on indication from proximity component 404 that security token device 102 is present and/or has been activated due to physical contact or physical proximity of security token device 102 within near-field communications range, can implement a challenge-response protocol between mobile device 106 and security token device 102 in order to prevent replay attacks (e.g., a form of network attack where valid data transmissions are maliciously or fraudulently repeated or delayed; such attacks are typically carried out by intercepting the data and retransmitting it, possibly as part of a masquerade attack by Internet Protocol (IP) packet substitution). For example, authentication component 406 can initiate a request to security token device 102 asking for a root key (e.g., $K_{root}$). Having initiated the request, authentication component 406 can wait for a response from security token device 102. Typically, the response received from security token device 102 will be a randomly generated number, but as will be apprehended, other randomly generated lexemes can be employed with equivalent effect without departing from the scope and intent of the claimed subject matter. Accordingly, when authentication component 406 receives a suitable response from security token device 102 (e.g., a randomly generated, or pseudo-randomly generated number) it can encrypt the randomly generated number using the mobile device's 106 associated private key (e.g., $K_{mobile\ device}^{private}$), and send the encrypted randomly generated number to security token device 102. Typically, security token device 102 on receiving the encrypted randomly generated number from mobile device 106 will utilize the mobile device's 106 public key (e.g., $K_{mobile\ device}^{public}$; a key previously disseminated by mobile device 106 to, and persisted on, security token device 102) to decrypt the encrypted randomly generated number received from mobile device 106 to ensure that the randomly generated number received was the randomly generated number that security token device 102 initial sent to mobile device 106. Once verification has been accomplished, authentication component 406 can await the root key (e.g., $K_{root}$) to be sent by security token device 102. Generally, it should noted that when security token device 102 transmits the root key to mobile device 106, it does so by encrypting the root key with the mobile device's 106 public key. As a note, it should be appreciated by those relatively cognizant in this field of endeavor that other secure communication protocols can be utilized with equal efficacy and still fall within the ambit of the subject matter as claimed.

Additionally, mobile device 106 can include power component 408 that can provide sufficient power to security token device 102 when mobile device 106 and security token device 102 are in close proximity or in momentary contact with one another so that security token device 102 can carry out its various and multiple functionalities.

Furthermore, mobile device 106 can include store 410 that can include any suitable data necessary for mobile device 106 and more particularly proximity component 404, authentication component 406, and power component 408 to facilitate their aims. For instance, store 410 can include information regarding user data, data related to a portion of a transaction, credit information, historic data related to a previous transaction, a portion of data associated with purchasing a good and/or service, a portion of data associated with selling a good and/or service, geographical location, online activity, previous online transactions, activity across disparate networks, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information obtained from the disparate network, ratings from a website, a credit score, geographical location, a donation to charity, or any other information related to software, applications, web conferencing, and/or any suitable data related to transactions, etc.

It is to be appreciated that store 410 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (eeprom), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink® DRAM (SLDRAM), Rambus® direct RAM (RDRAM), direct Rambus® dynamic RAM (DRDRAM) and Rambus® dynamic RAM (RDRAM). Store 410 of the subject systems and methods is intended to comprise, without being limited to, these and any other suitable types of memory. In addition, it is to be appreciated that store 410 can be a server, a database, a hard drive, and the like.

Figure 5:
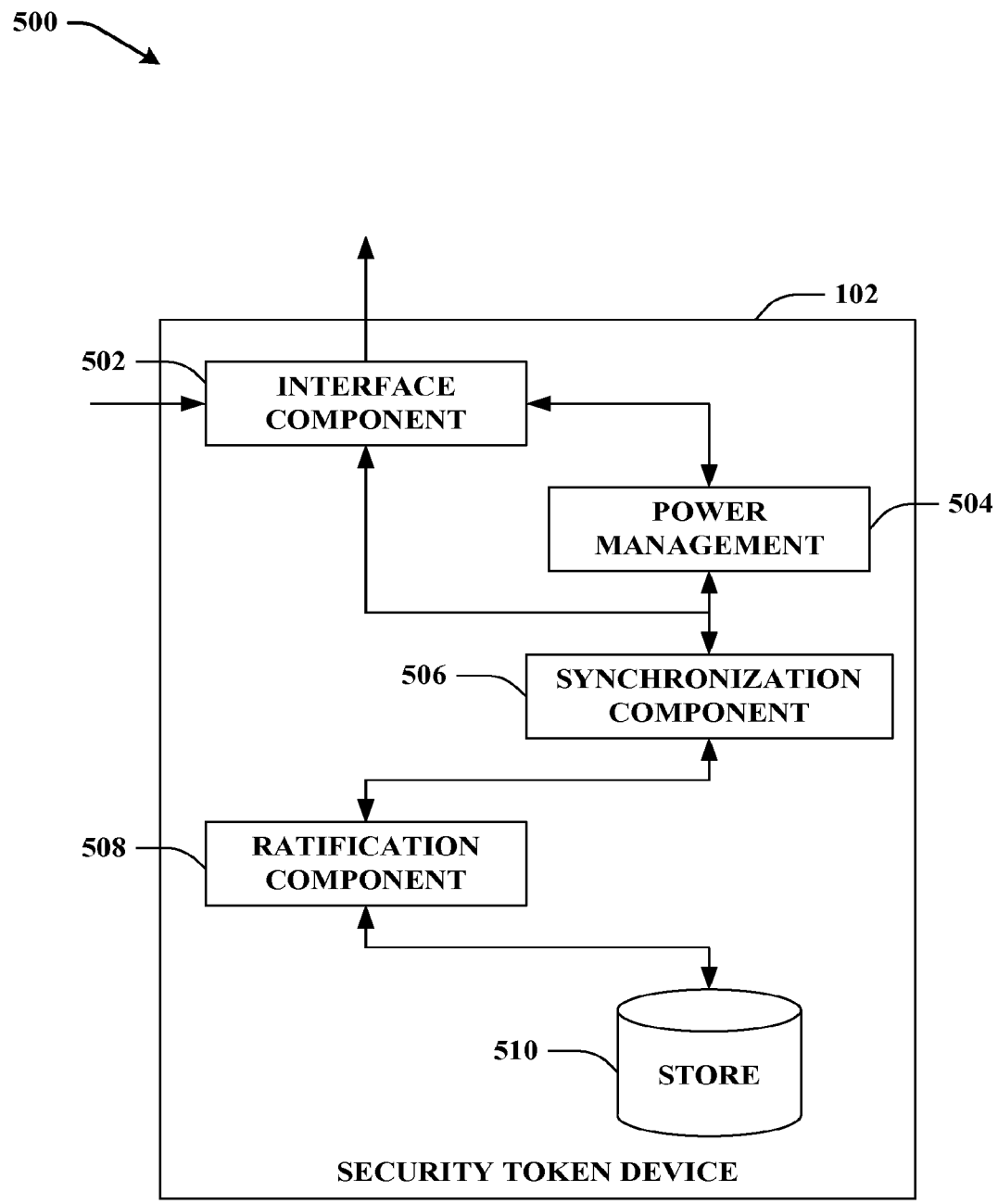
FIG. 5 provides a more detailed illustration of a security token device that can be employed in accordance with an aspect of the claimed subject matter.

FIG. 5 provides more detailed illustration 500 of security token device 102 in accordance with an aspect of the claimed subject matter. Security token device 102 can include interface component 502 (hereinafter referred to as "interface 502") that can be in constant and/or sporadic but operative communications with mobile device 106 via network topology 104. Since the functionality and features of interface 502 are similar to those disclosed in the context of interface 402, a more in depth description of such features and functionality has been omitted for the sake of brevity.

Security token device 102 in addition to interface 502 can also include power management component 504 that can parasitically draw power from a plurality of sources. For example, since security token device 102 does not typically have an independent power source of its own, it can utilize power generated by mobile device 106 when mobile device 106 is in close proximity or in the vicinity of security token device 102. It should be noted that security token device 102 is not necessarily confined to drawing power from mobile devices specifically tied or associated with it, but can draw power from any proximate device (e.g., non-mobile devices, such as household appliances, consumer and industrial electronic or electrical equipment and components thereof, desktop computers, laptop computers, and the like) apart from or in addition to mobile device 106. Additionally and/or alternatively, power management component 504 can draw or obtain power by way of electrical impulses naturally generated by muscle contractions or spasms, for example.

Security token device 102 can also include synchronization component 506 that detects whether or not security token device 102 is in close proximity to, or in physical contact with, mobile device 106. Synchronization component 506 can ascertain whether or not a previously associated mobile device 106 is in close proximity, and if such a mobile device 106 has requested supply of a root key (e.g., $K_{root}$) to lock, unlock, encrypt, or decrypt sensitive personal information persisted on mobile device 106.

In addition security token device 102 can include ratification component 508 that can utilize input from synchronization component 506 as to whether of not security token device 102 and mobile device 106 are in close proximity to, or in physical contact with, one another, and whether a request for a root key (e.g., $K_{root}$) has been received from mobile device 106, to initiate a ratification sequence. The ratification sequence can include generating a random number that can be sent to mobile device 106 after which ratification component 508 can wait for mobile device 106 to respond with an encrypted version of the previously sent randomly generated number. It should be noted that the encryption key utilized by mobile device 106 to encipher the randomly generated number will typically be its private key (e.g., $K_{mobile\ device}^{private}$). On receipt of the encrypted randomly selected number, ratification component 508 can utilize mobile device's 106 public key (e.g., $K_{mobile\ device}^{public}$) to decrypt the encrypted number to determine whether or not the encrypted number corresponds to the randomly generated number initially sent. Where there is a correlation between the two numbers, ratification component 508 can forward the root key (e.g., $K_{root}$) encrypted with the mobile device's 106 public key (e.g., $K_{mobile\ device}^{public}$) to mobile device 106.

In addition, security token device 102 can also include store 510 that can be utilized to persist root keys (e.g., $K_{root}$), and various public-private key pairs for a multiplicity of mobile devices that can be owned by an individual user.

In view of the exemplary systems shown and described supra, methodologies that may be implemented in accordance with the disclosed subject matter will be better appreciated with reference to the flow chart of FIGS. 6-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

Figure 6:
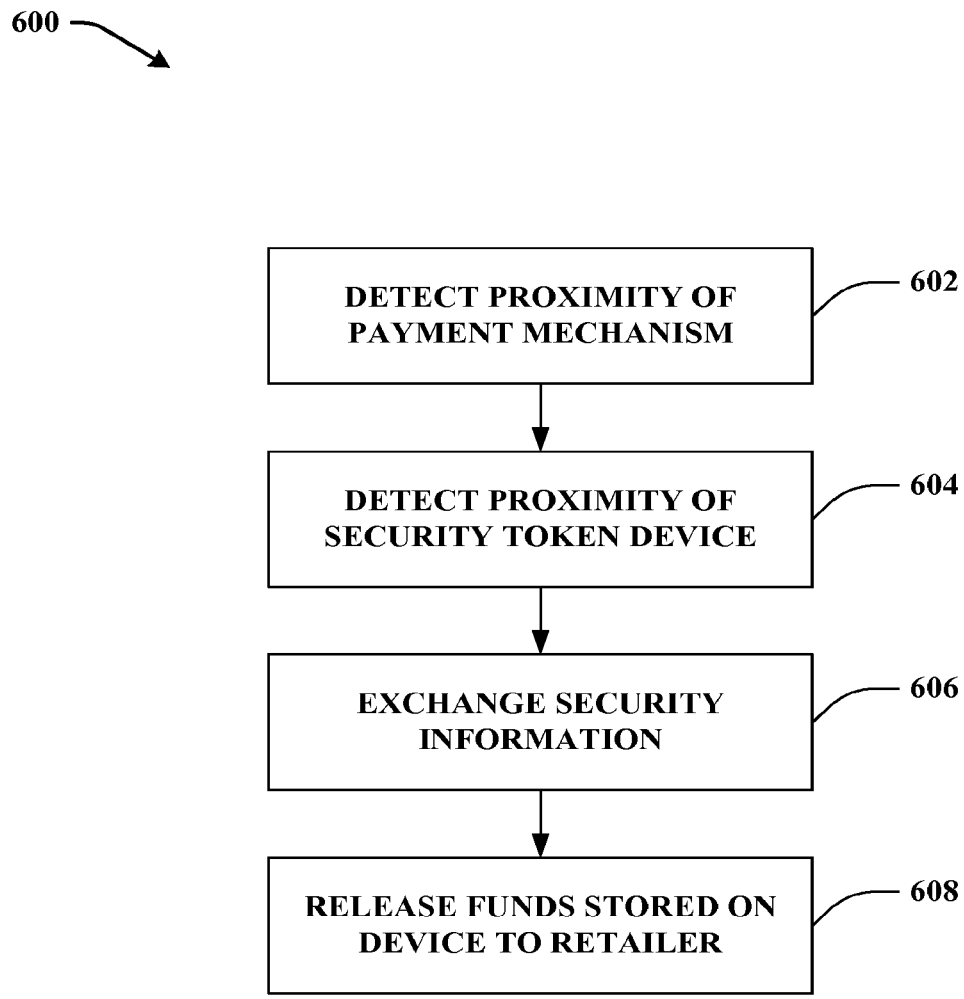
FIG. 6 depicts a flow diagram of a machine implemented methodology that facilitates, establishes, and effectuates mobile device security in accordance with an aspect of the claimed subject matter.

FIG. 6 provides depiction in flowchart form of a machine implemented methodology 600 for effectuating, establishing, and/or facilitating mobile device security in accordance with an aspect of the claimed subject matter. Method 600 can commence at 602 where detection of payment mechanisms can take place. Typically, the user of a mobile device will want to make a purchase of goods and/or services at which point the user can place his or her mobile device in close proximity to the payment mechanism (e.g., swipe the mobile device past the payment mechanism), the mobile device will then be able to glean the payment price (e.g., the amount to be paid) from the payment mechanism. Examples of payment mechanisms can include electronic transfer automated teller machines, retail point of sales mechanisms and the like. Having detected a payment mechanism method 600 can proceed to 604 at which point the mobile device can commence searching and/or detecting for the presence of a security token device. Here for example, the user can bring the mobile device into contact or close proximity with the secure token device so that each the mobile device and/or the secure token device become cognizant of each others presence. At 606 security information can be exchanged between the mobile device and the security token device in order for a root key to be disseminated to the mobile device so that the mobile device can effectuate payment of whatever debt that accrued. At 608 "electronic" funds that may have previously been persisted or associated with the mobile can be released and disbursed in fulfillment of the debt accumulated based at least in part on the root key obtained from the security token device.

Figure 7:
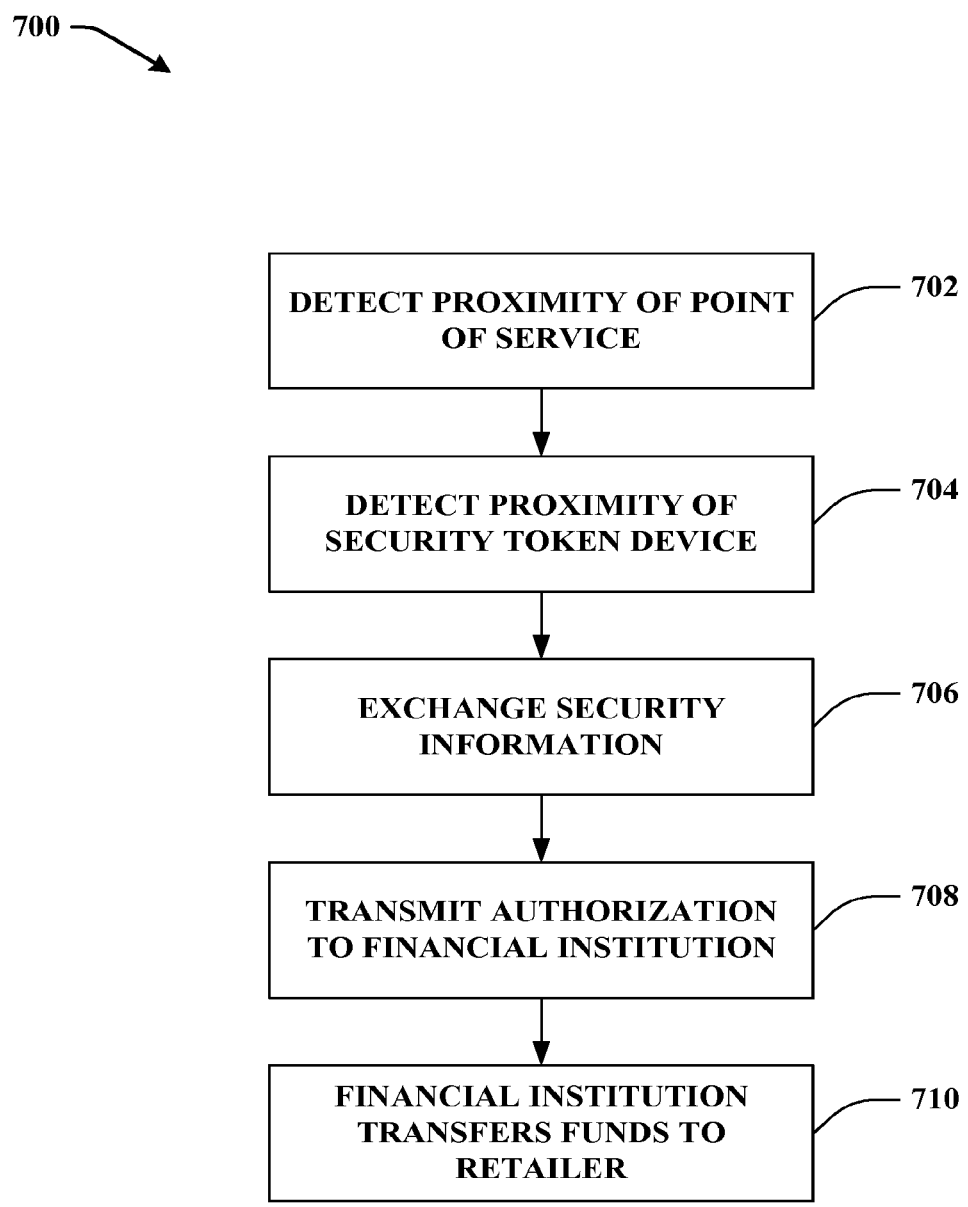
FIG. 7 depicts another flow diagram of a machine implemented methodology that facilitates, establishes, and effectuates mobile device security in accordance with an aspect of the claimed subject matter.

FIG. 7 illustrates a machine implemented method 700 for establishing, effectuating, and/or facilitating mobile device security in accordance with an aspect of the claimed subject matter. Method 700 can commence at 702 where detection of payment mechanisms by a mobile device can take place after which method 700 can proceed to 704 at which point the mobile device can commence searching and/or detecting for the presence of a security token device. At 706 security information can be exchanged between the mobile device and the security token device in order for a root key to be disseminated to the mobile device so that the mobile device can effectuate payment of whatever debt that accrued. At 708 mobile device, based at least in part on sensitive personal information persisted on the mobile device and temporarily unlocked or decrypted with the root key obtained from security token device, can send pertinent details to a financial institution so that "electronic" funds that can be released and disbursed to fulfill the debt accumulated by the user of the mobile device at 710. For example, at 710 there can be an electronic transfer of funds to the user of the mobile device's account to a retailer's bank account.

Figure 8:
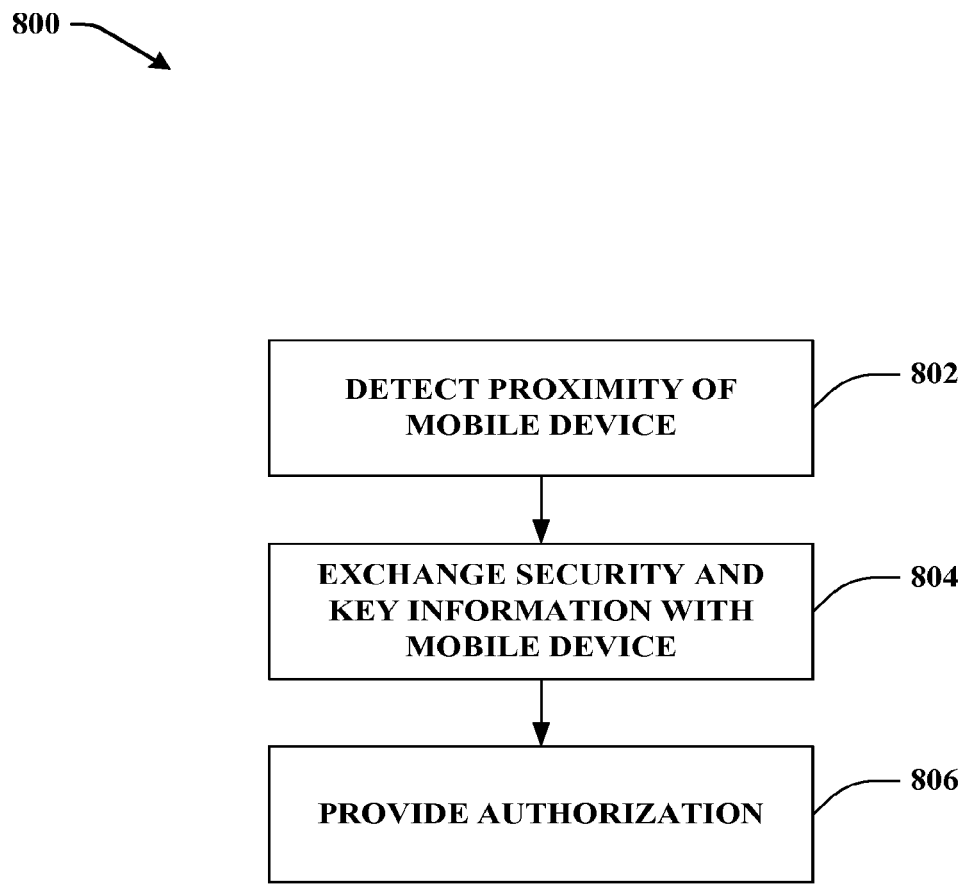
FIG. 8 depicts yet another flow diagram of a machine implemented methodology that facilitates, establishes, and effectuates mobile device security in accordance with an aspect of the claimed subject matter.

FIG. 8 provides further illustration of a method 800 implemented on a machine for effectuating and/or establishing mobile device security in accordance with an aspect of the claimed subject matter. Method 800 can commence at 802 where a security token device can detect the proximity of an associated mobile device (e.g., a mobile device for which the security token device has at least the public key—$K_{mobile\ device}^{public}$). Once security token device has detected the presence of an associated mobile device method 800 can proceed to 804 where security and key information (e.g., the root key) can be exchanged between security token device and mobile device. At 806 with the root key sensitive personal information persisted or associated with the mobile device can be decrypted or unlocked and thereafter this sensitive and/or personal information can be employed to effectuate payment of a debt that can have been accumulated by the owner of the mobile device.

Figure 9:
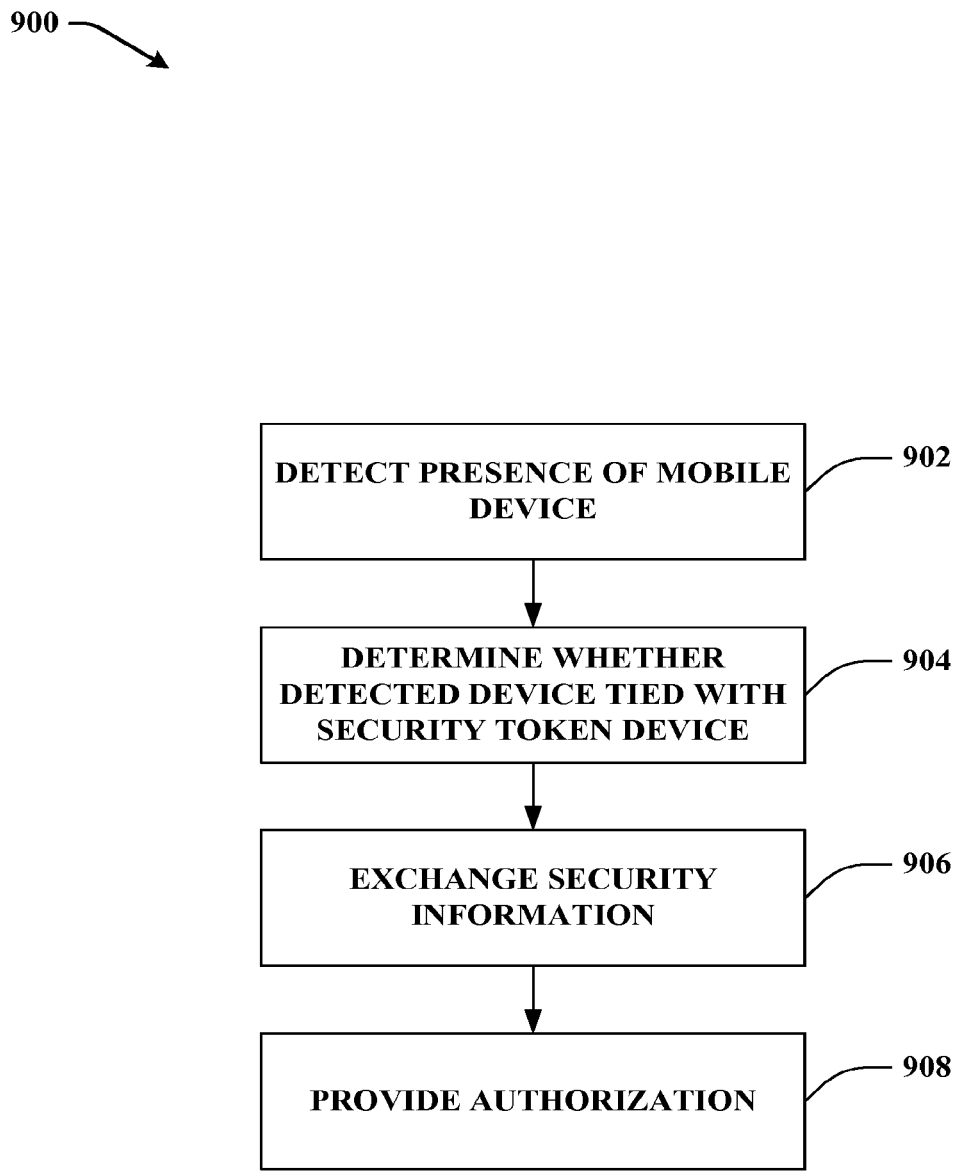
FIG. 9 illustrates a further flow diagram of a machine implemented methodology that facilitates, establishes, and effectuates mobile device security in accordance with an aspect of the claimed subject matter.

FIG. 9 depicts a method 900 that can be implemented on a machine for effectuating mobile device security in accordance with yet another aspect of the claimed subject matter. Method 900 can start at 902 where the presence of a mobile device in the vicinity of a secure token device is detected, At 904 an ascertainment can be undertaken to determine whether the detected mobile device and the secure token device have been previously associated or tied with one another (e.g., by determining whether respective public keys for the public-private key pairing are stored appropriately—$K_{mobile\ device}^{public}$ and $K_{secure\ token}^{public}$ are respectively stored or associated with secure token device and mobile device respectively. At 906 security information can be exchanged between the mobile device and/or secure token device in order to establish and verify the appropriateness of sending mobile device a requested root key (e.g., $K_{root}$). Where a requested root key (e.g., $K_{root}$) is dispatched by security token device to mobile device, mobile device can, at 908, employ the root key to unlock and/or decrypt previously locked and/or encrypted sensitive information stored or associated with mobile device to provide authorization to a financial institution to satisfy the debt so that the owner of the mobile device can receive the goods or services desired.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

As used in this application, the terms "component" and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 10:
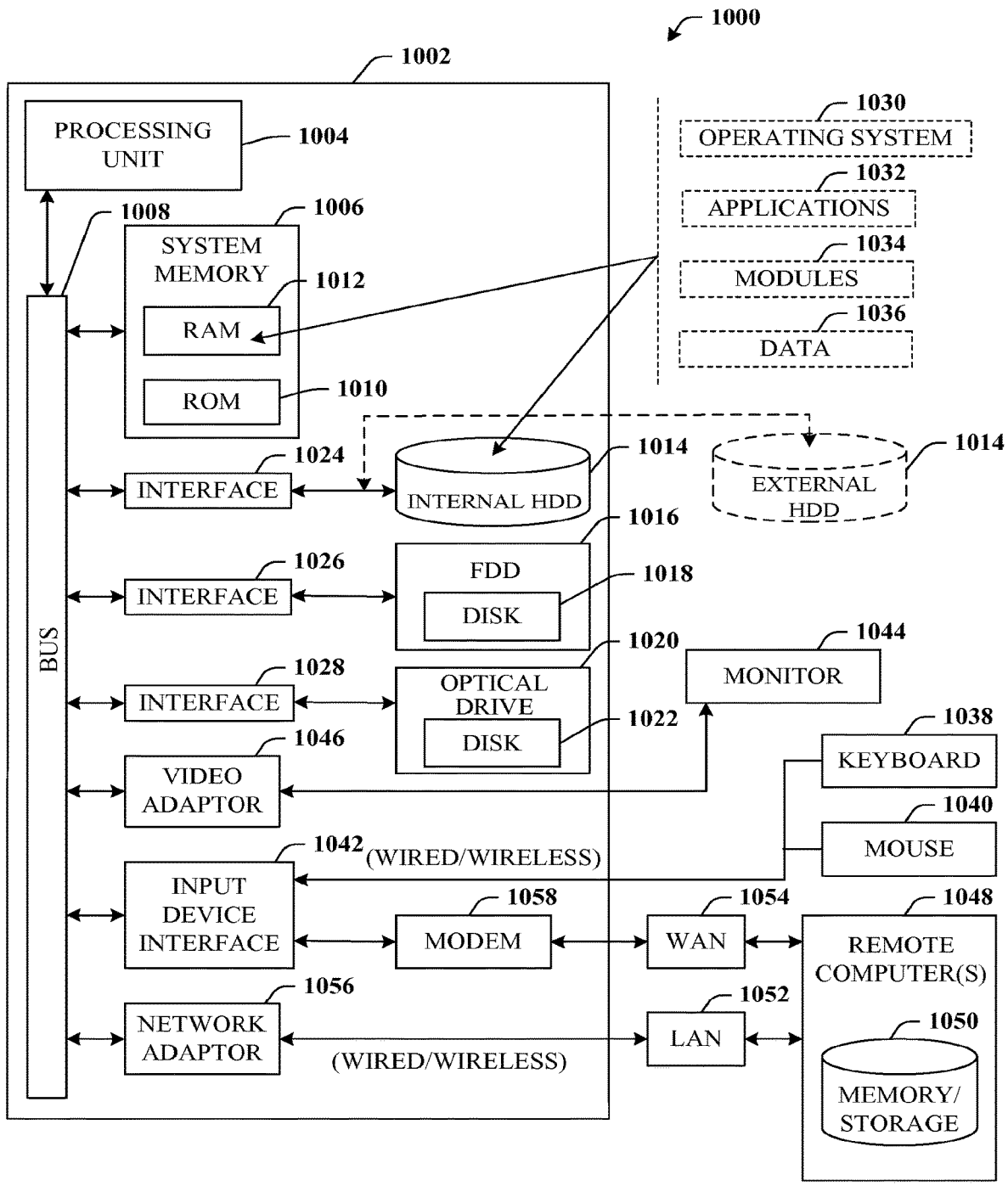
FIG. 10 illustrates a block diagram of a computer operable to execute the disclosed system in accordance with an aspect of the claimed subject matter.

Referring now to FIG. 10, there is illustrated a block diagram of a computer operable to execute the disclosed system. In order to provide additional context for various aspects thereof, FIG. 10 and the following discussion are intended to provide a brief, general description of a suitable computing environment 1000 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1094 interface technologies. Other external drive connection technologies are within contemplation of the claimed subject matter.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1094 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 11:
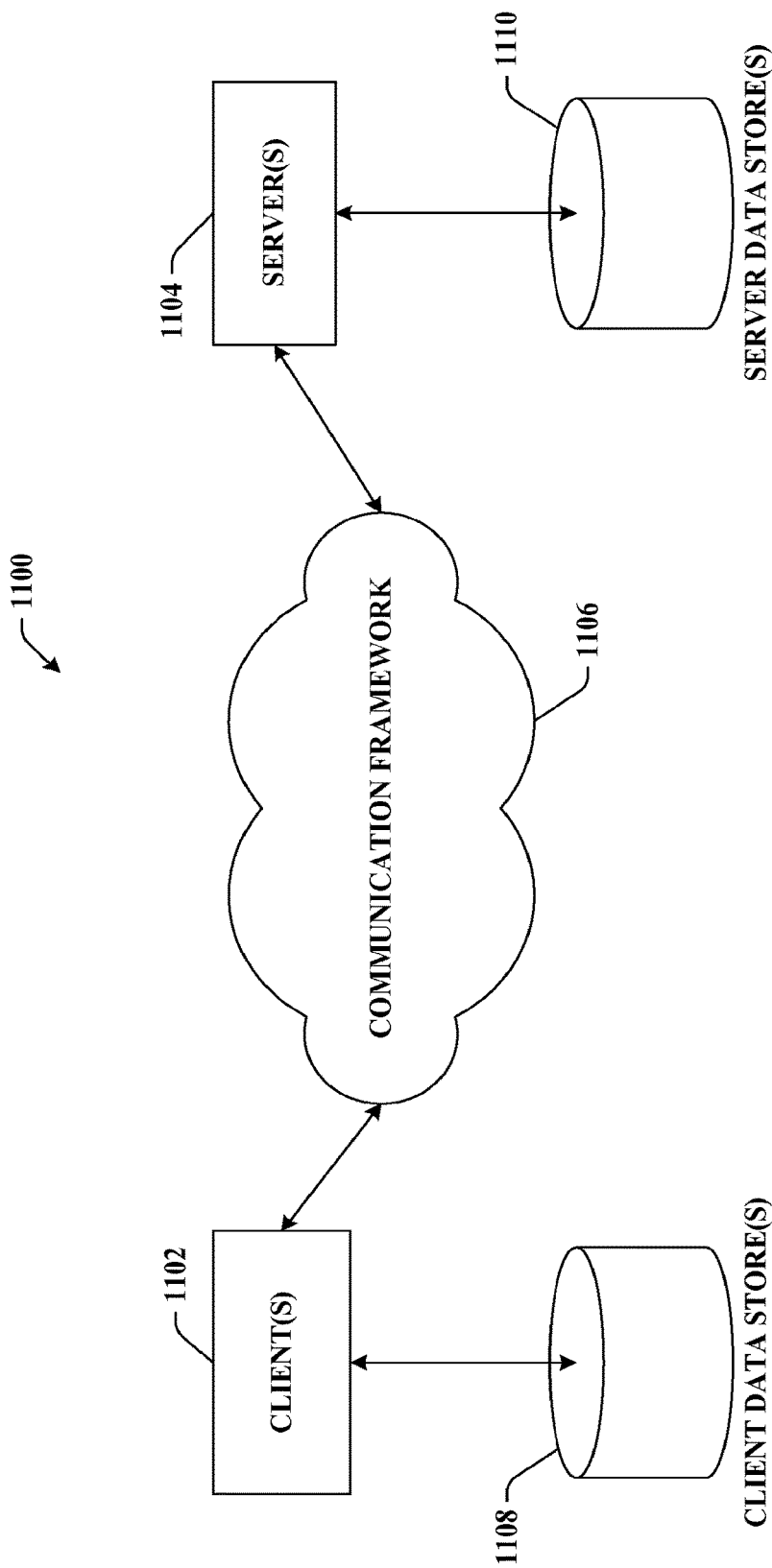
FIG. 11 illustrates a schematic block diagram of an illustrative computing environment for processing the disclosed architecture in accordance with another aspect.

Referring now to FIG. 11, there is illustrated a schematic block diagram of an exemplary computing environment 1100 for processing the disclosed architecture in accordance with another aspect. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer system comprising:
   one or more processors; and
   one or more computer-readable hardware storage devices having stored thereon computer-executable instructions, the computer-executable instructions being executable by the one or more processors to cause the computer system to:
   detect a presence of a transaction processing device;
   receive transaction information from the transaction processing device, the transaction information corresponding to a current transaction event occurring between the computer system and the transaction processing device;
   after receiving the transaction information, establish a communication link with an on-body security device, the on-body security device including authentication information that is necessary to complete the current transaction event;
   receive, via the communication link, the authentication information from the on-body security device, wherein the received authentication information is operable to temporarily unlock sensitive data stored on the computer system; and
   use the received authentication information to temporarily unlock the sensitive data; and
   to provide the sensitive data, after it is temporarily unlocked using the authentication information, to the transaction processing device for completing the current transaction event.

2. The computer system of claim 1, wherein the on-body security device is one of a wrist band, finger ring, necklace, earring, labret, or textile.

3. The computer system of claim 1, wherein the computer system is a mobile telephone.

4. The computer system of claim 1, wherein the computer system provides power to the on-body security device when the on-body security device is within a particular proximate distance to the computer system.

5. The computer system of claim 1, wherein the computer system maintains an intermittent communication link with the on-body security device.

6. The computer system of claim 1, wherein the communication link is a continuous communication link.

7. The computer system of claim 1, wherein the computer system previously authenticated itself with the on-body security device.

8. The computer system of claim 1, wherein the authentication information includes a root key.

9. The computer system of claim 1, wherein the received authentication information is encrypted when it is transmitted by the on-body security device to the computer system, and wherein the computer-system decrypts the received authentication information prior to using it to complete the current transaction event.

10. The computer system of claim 1, wherein detecting the presence of the transaction processing device is performed by physically placing the computer system within a particular proximate distance to the transaction processing device.

11. The computer system of claim 1, wherein the transaction information includes an amount owed corresponding to the current transaction event.

12. The computer system of claim 1, wherein, after the communication link is established with the on-body security device, execution of the computer-executable instructions further causes the computer system to query the on-body security device, the query including a randomly-generated number, the randomly-generated number being encrypted using a public key of the on-body security device.

13. The computer system of claim 12, wherein, after the on-body security device receives the query, the computer system receives a response number from the on-body security device, the response number having been encrypted by the on-body security device using a public key of the computer system, wherein the response number, after being decrypted by the computer system, is of a same value as the randomly-generated number.

14. A method for completing a transaction event using authentication information, the method being implemented by one or more processors of a computer system, the method comprising:
  detecting a presence of a transaction processing device;
  receiving transaction information from the transaction processing device, the transaction information corresponding to a current transaction event occurring between the computer system and the transaction processing device;
  after receiving the transaction information, establishing a communication link with an on-body security device, the on-body security device including authentication information that is necessary to complete the current transaction event;
  receiving, via the communication link, the authentication information from the on-body security device, wherein the received authentication information is operable to temporarily unlock sensitive data stored on the computer system; and
  using the received authentication information to temporarily unlock the sensitive data; and
  to provide the sensitive data, after it is temporarily unlocked using the authentication information, to the transaction processing device for completing the current transaction event.

15. The method of claim 14, wherein the on-body security device is a finger ring.

16. The method of claim 14, wherein the received authentication information is encrypted prior to being received by the computer system, and wherein the received authentication information is decrypted prior to the current transaction being completed.

* * * * *